US009407907B2

(12) United States Patent
Gaudreau

(10) Patent No.: US 9,407,907 B2
(45) Date of Patent: Aug. 2, 2016

(54) METHOD AND DISPLAY FOR CONCURRENTLY DISPLAYING A FIRST IMAGE AND A SECOND IMAGE

(75) Inventor: Jean-Etienne Gaudreau, Longueuil (CA)

(73) Assignee: ÉCRANS POLAIRES INC./POLAR SCREENS INC., Longueuil, Quebec (CA)

( * ) Notice: Subject to any disclaimer, the term of this patent is extended or adjusted under 35 U.S.C. 154(b) by 185 days.

(21) Appl. No.: 14/115,205

(22) PCT Filed: May 10, 2012

(86) PCT No.: PCT/CA2012/000444
§ 371 (c)(1),
(2), (4) Date: Nov. 1, 2013

(87) PCT Pub. No.: WO2012/155243
PCT Pub. Date: Nov. 22, 2012

(65) Prior Publication Data
US 2014/0104402 A1    Apr. 17, 2014

Related U.S. Application Data

(60) Provisional application No. 61/485,882, filed on May 13, 2011.

(51) Int. Cl.
*H04N 13/04* (2006.01)
*G02B 27/26* (2006.01)
*G02B 27/22* (2006.01)

(52) U.S. Cl.
CPC ........ *H04N 13/0486* (2013.01); *G02B 27/2264* (2013.01); *G02B 27/26* (2013.01); *H04N 13/0418* (2013.01); *H04N 13/0422* (2013.01); *H04N 13/0434* (2013.01)

(58) Field of Classification Search
CPC ................... G02F 2001/133631; G02B 27/26; G02B 27/2264; H04N 13/0418; H04N 13/0486; H04N 13/0434; H04N 13/0422
See application file for complete search history.

(56) References Cited

U.S. PATENT DOCUMENTS 4,561,731 A   12/1985 Kley
5,233,373 A   8/1993 Peters et al.
(Continued)

FOREIGN PATENT DOCUMENTS

EP   0294122 A1   12/1988
EP   1358766 A1   11/2003
(Continued)

*Primary Examiner* — Jessica M Merlin
(74) *Attorney, Agent, or Firm* — BCF LLP

(57) ABSTRACT

The present disclosure relates to methods and display systems for concurrently displaying two complementary images. Collimated light comprising interlaced series of left and right image rows are received, at angles that alternate over time, on an intensity modulation matrix. The collimated light is transmitted to a patterned retarder capable of applying spatially alternating polarizations to successive rows. The collimated light is further transmitted to a display layer. The angles at which collimated light is received on the intensity modulation matrix and distances between display system components are such that odd lines of the display layer alternate in time between lines of a first image and lines of a second image while even lines of the display layer alternate between lines of the second image and lines of the first image. The first and second images may be discriminated by viewers using polarized glasses.

13 Claims, 16 Drawing Sheets

(56) References Cited

U.S. PATENT DOCUMENTS

| | | | |
|---|---|---|---|
| 5,396,303 A | 3/1995 | Peters et al. | |
| 5,420,689 A | 5/1995 | Siu | |
| 5,519,533 A * | 5/1996 | Nomura | G02B 27/22 345/32 |
| 5,548,427 A * | 8/1996 | May | 349/117 |
| 5,871,266 A | 2/1999 | Negishi et al. | |
| 6,002,518 A | 12/1999 | Faris | |
| 6,649,925 B2 | 11/2003 | Talmi | |
| 6,888,612 B2 | 5/2005 | Faris | |
| 6,927,769 B2 | 8/2005 | Roche, Jr. | |
| 6,950,493 B2 | 9/2005 | Besson | |
| 7,006,125 B2 | 2/2006 | Divelbiss et al. | |
| 7,180,554 B2 | 2/2007 | Divelbiss et al. | |
| 7,215,357 B1 | 5/2007 | Swift et al. | |
| 7,355,658 B2 | 4/2008 | Ioki et al. | |
| 7,432,901 B2 | 10/2008 | Baek et al. | |
| 7,432,996 B2 | 10/2008 | Ioki et al. | |
| 7,489,311 B2 | 2/2009 | Lee | |
| 7,545,466 B2 | 6/2009 | Lee | |
| 7,580,085 B2 | 8/2009 | Jacobs et al. | |
| 7,612,833 B2 | 11/2009 | Kim | |
| 7,623,111 B2 | 11/2009 | Ioki et al. | |
| 7,697,750 B2 | 4/2010 | Simmons | |
| 7,714,946 B2 | 5/2010 | Hong et al. | |
| 7,753,529 B2 | 7/2010 | Fukaishi et al. | |
| 7,804,549 B2 | 9/2010 | Ioki et al. | |
| 7,808,564 B2 | 10/2010 | Tamura et al. | |
| 7,855,756 B2 | 12/2010 | Hong et al. | |
| 7,876,350 B2 | 1/2011 | Shin et al. | |
| 7,876,489 B2 | 1/2011 | Gandhi et al. | |
| 2005/0168815 A1 | 8/2005 | Maruyama et al. | |
| 2005/0168816 A1 | 8/2005 | Fukaishi et al. | |
| 2006/0146404 A1 | 7/2006 | Ioki et al. | |
| 2006/0192746 A1 | 8/2006 | Ioki et al. | |
| 2006/0203084 A1 | 9/2006 | Okazaki et al. | |
| 2006/0221444 A1 | 10/2006 | Fukaishi et al. | |
| 2007/0091436 A1 | 4/2007 | Aoki et al. | |
| 2007/0222954 A1 | 9/2007 | Hattori | |
| 2008/0239483 A1 | 10/2008 | Kuroda et al. | |
| 2008/0239484 A1 * | 10/2008 | Fukaishi et al. | 359/465 |
| 2008/0239485 A1 | 10/2008 | Kuroda et al. | |
| 2008/0297592 A1 | 12/2008 | Oyamada et al. | |
| 2008/0297897 A1 | 12/2008 | Oyamada et al. | |
| 2008/0304151 A1 | 12/2008 | Ura | |
| 2009/0141122 A1 | 6/2009 | Hong | |
| 2009/0190213 A1 | 7/2009 | Tamura et al. | |
| 2010/0007716 A1 | 1/2010 | Lee et al. | |
| 2010/0041299 A1 | 2/2010 | Tamura et al. | |
| 2010/0265230 A1 * | 10/2010 | Kang | 345/211 |
| 2011/0025833 A1 | 2/2011 | Baik et al. | |
| 2011/0063424 A1 | 3/2011 | Matsuhiro et al. | |
| 2012/0002123 A1 | 1/2012 | Kang | |

FOREIGN PATENT DOCUMENTS

| | | |
|---|---|---|
| EP | 1965245 A1 | 9/2008 |
| WO | 9500872 A1 | 1/1995 |
| WO | 9854548 A1 | 12/1998 |
| WO | 0197531 A2 | 12/2001 |
| WO | 02076107 A1 | 9/2002 |
| WO | 2004066203 A2 | 8/2004 |
| WO | 2004111913 A2 | 12/2004 |
| WO | 2008091407 A2 | 7/2008 |
| WO | 2010067506 A1 | 6/2010 |

* cited by examiner

US 9,407,907 B2

METHOD AND DISPLAY FOR CONCURRENTLY DISPLAYING A FIRST IMAGE AND A SECOND IMAGE

TECHNICAL FIELD

The present disclosure relates to the field of electronic displays. More specifically, the present disclosure relates to display systems and methods for concurrently showing two complementary images.

BACKGROUND

Stereoscopic visual displays, also called three-dimensional (3D) displays, are rapidly becoming ubiquitous. These devices are commonly used for viewing 3D movies or for gaming applications. Use of stereoscopic technology may create realistic games or scenery by providing depth to objects, through presenting a unique view to each eye of a viewer, in a way approaching a real life viewer experience. In polarization technology 3D TV, linear polarized and circularly polarized lights are used to separate two complementary views. According to other 3D vision methods, left and right images are displayed alternatively and shutter glasses are used to separate the two views.

Stereoscopic imaging requires simultaneous display of two complementary images, emitted at distinct polarizations; viewers wear special glasses having distinct filters on the left and right sides to ensure that each eye perceives a distinct one of the complementary images. A conventional manner of showing the two complementary images is to split the viewing area of a display, line by line, so that for example, even lines show a left image and odd lines show a right image. Of course, a resulting image resolution is only half of a full resolution achievable in two-dimensional (2D) mode, with the same display.

Conventionally, emission of the two complementary images at distinct polarizations is obtained by adding a Horizontal Patterned Retarder Layer in front of a liquid crystal display (LCD). The LCD produces alternating left and right lines and the filter then applies alternating polarization to the left and right lines. This structure introduces significant crosstalk between the left and right images, perceived with much emphasis by viewers located outside of a narrow vertical angular range relative to the display.

Therefore, there is a need for method and devices for displaying 3D images of good resolution while reducing crosstalk effects that may be perceived by a user wearing passive polarized glasses.

SUMMARY

In one aspect, the present disclosure introduces a method for concurrently displaying a first image and a second image. Collimated light is received on an intensity modulation matrix. The collimated light impinges on the intensity modulation matrix at two angles alternating over time. The collimated light is transmitted from the intensity modulation matrix to a patterned retarder comprising successive rows applying spatially alternating polarizations. The collimated light is further transmitted from the patterned retarder to a display layer. As a result, a given row on the display layer alternates over time between light having a first polarization and light having a second polarization.

In another aspect, the present disclosure introduces a display comprising an intensity modulation matrix, a patterned retarder and a display layer. The intensity modulation matrix receives collimated light impinging on the intensity modulation matrix at two angles that alternate over time. The patterned retarder comprises rows having spatially alternating polarizations. The collimated light is received at the patterned retarder from the intensity modulation matrix. The display layer then receives the collimated light from the patterned retarder. Relative placement of the intensity modulation matrix, of the patterned retarder and of the display layer is configured for alternating over time a given row on the display layer between light having a first polarization and light having a second polarization.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which:

FIG. 2b is a schematic, top plan view of the display system of FIG. 2a;

FIG. 3b is a schematic, top plan view of the display system of FIG. 3a;

FIG. 6 is a schematic, perspective view of the display system of FIG. 2a;

DETAILED DESCRIPTION

Figure 1:
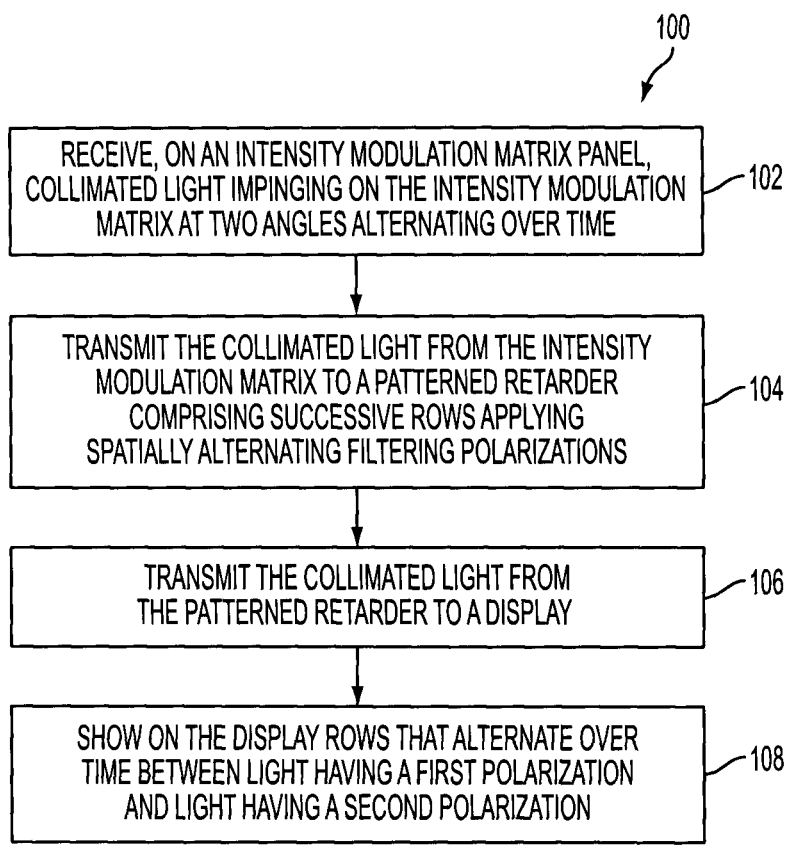
FIG. 1 is an example of a method for concurrently displaying a first image and a second image according to an embodiment.

Various aspects of the present disclosure generally address one or more of the problems of related to cross talk and reduced resolution of conventional three-dimensional (3D) display systems. Embodiments of the method and display of the present disclosure relate to stereoscopic display systems that transmit, on each picture element of a display surface, information needed to visualize two complementary images for creating the visual effect of a three-dimensional image. Images appearing on the display surface may be fixed or animated. In particular embodiments, the present disclosure relates to such display systems using liquid crystal (LC) panels and liquid crystal display (LCD) devices. Other embodiments may use other types of light valve matrices.

In some aspects, a display system comprises an intensity modulation matrix receiving collimated light at two angles that alternate over time. Light passes through the intensity modulation matrix, through a patterned quarter wave or half wave retarder, and then through a diffuser layer acting as a display layer. Angles of the collimated light, positions of the intensity modulation matrix, of the patterned retarder and of the diffuser layer, and respective distances therebetween, are set in such a way that the diffuser layer shows the collimated light on its entire surface, each odd row of the diffuser layer alternating over time between lines of a first image and lines of a second image while each even row of the diffuser layer alternates over time between lines of the second image and lines of the first image.

The following terminology is used throughout the present disclosure:

Polarization of light: organization of the orientation of light waves along a given axis;

Intensity modulation matrix: a component capable of modifying light intensity according to a position of the light determined by rows and columns of a matrix, wherein a row index and a column index may correspond, for example, for an image pixel;

Display: a device generally for showing a video image; it is noted that the term "display" is also used in spelling out the acronym "LCD" for "liquid crystal display";

Display layer: the part of a display system that shows an externally visible image;

Lenticular lens: array of magnifying lenses that magnifies images differently when a viewer is a various angles;

Impinge: action of light arriving on a surface;

Alternating angles: angles that vary over time between two values;

Rows: contiguous linear pixels of an image, whether considered horizontally or vertically; by extension, rows of a display, of a matrix, and the like;

Interlace: manner of alternately displaying rows of a first image and rows of a second image;

Stereoscopic: characteristic of three-dimensional images;

Linear polarization: continuous polarization of light at a fixed angle;

Circular polarization: polarization of light at a continuously and regularly varying angle;

Complementary images: left and right components of a 3D image or different views for simultaneous showing to different users, for example for a gaming application;

Patterned retarder: component that modifies an angular polarization of a light wave, according to a predefined pattern, for example in spatially alternating rows;

Spatially alternating polarization: time invariant, row-wise change of polarization;

Fast axis: a polarization angle along which light travels fastest, within a patterned retarder.

Referring now to the drawings, FIG. 1 is an example of a method for concurrently displaying a first image and a second image according to an embodiment. A sequence 100 comprises a first step 102 of receiving collimated light impinging on an image forming intensity modulation matrix at two angles that are alternating over time. The intensity modulation matrix may for example be an LCD panel, as will be shown in more details hereinbelow. The light is transmitted through the intensity modulation matrix, at step 104. The light, which is then carrying image lines, arrives on a patterned retarder comprising successive rows applying spatially alternating polarizations. The light is further transmitted from the patterned retarder to a display, at step 106. At step 108, the display shows rows of light that alternate over time between a first polarization and a second polarization. Because rows of the patterned retarder have spatially alternating polarizations, a given row of light on the display alternates over time between the first polarization and the second polarization while a next row on the display alternates between the second polarization and the first polarization.

Figure 2A:
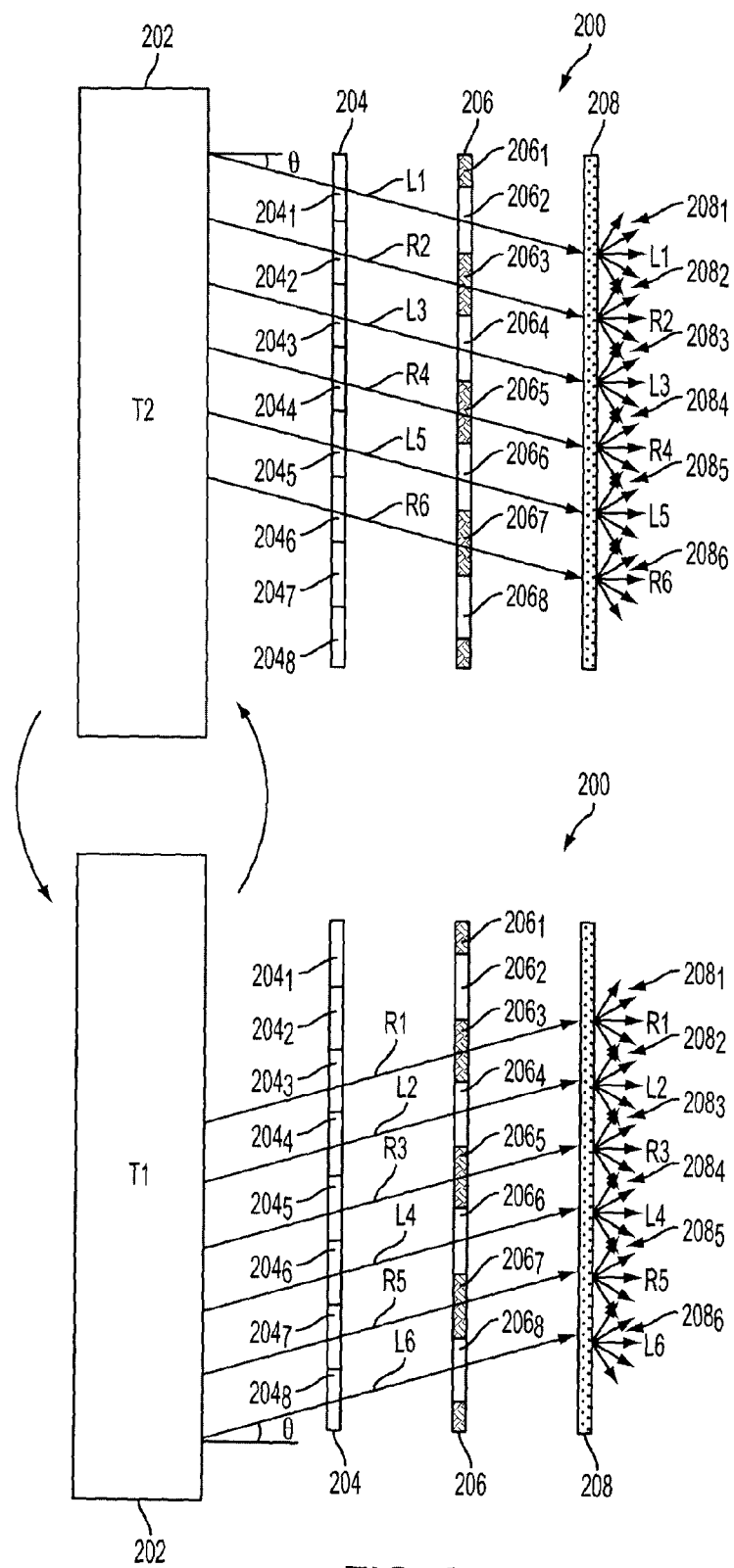
FIG. 2a is a schematic, side elevation view of a display system according to an embodiment.

FIG. 2a is a schematic, side elevation view of a display system according to an embodiment. FIG. 2a is split into two (2) images of a display system 200, a bottom part of FIG. 2a showing the display system 200 at a time interval T1 and the top part of FIG. 2a showing the display system 200 at a time interval T2. It is to be understood that the time intervals T1 and T2 follow each other in a rapid succession; for example, the frequency at which T1 and T2 occur may be 30 Hertz, 60 Hertz, or 120 Hertz. Those of ordinary skill in the art will appreciate that other timing intervals may suitably be used. The display system comprises a intensity modulation matrix 204 comprising lines $204_i$, a patterned retarder 206 comprising lines $206_i$ and a display layer 208 comprising lines $208_i$. A light source 202 is also shown on FIG. 2a. The light source 202 emits collimated light impinging onto the intensity modulation matrix 204 at a first angle during interval T1 and at a second angle during interval T2. The first and second angles are thus alternating angles, following a T1-T2-T1-T2 . . . sequence. On FIG. 2a, indicia "L" may represent lines of a left part of stereoscopic images while indicia "R" may represent lines of a right part of the stereoscopic images. As will be expressed hereinbelow, the display system 200 may be used for concurrently displaying distinct images that are not part of a 3D image. It should thus be understood that references to "left" and "right" image lines or image components are used to simplify the present description are not meant to limit the present disclosure solely to stereoscopic applications.

The intensity modulation matrix 204 emits left and right images by alternating each line, or image row, between a left line and a right line of a 3D image. Rather than emitting at once a complete left image and then a complete right image, the intensity modulation matrix 204 interlaces left and right lines. At interval T1 (bottom of FIG. 2a), the intensity modulation matrix 204 emits odd-numbered right lines R1, R3, R5 . . . interlaced with even-numbered left lines L2, L4, L6, and so on. At interval T2 (top of FIG. 2a), the intensity modulation matrix 204 emits-odd numbered left lines interlaced with even-numbered left lines. Light is emitted by the light source 202 during interval T1 at a first angle θ and during interval T2 at a second angle −θ. Values of the angles θ and −θ, positions of each line as emitted from the light source 202 and respective distances between the light source 202, the intensity modulation matrix 204, the patterned retarder 206 and the display layer 208 are determined so that a first, left or right image line, L1 or R1, consistently appears on the display layer 208 on a first display layer line $208_1$. In an embodiment, a distance between the intensity modulation matrix 204 and the patterned retarder 206 may be set to 0.9 mm while a distance between the patterned retarder 206 and the display layer 208 may also be set to 0.9 mm. In other embodiments, values of the angles may be 0 and 20 instead of θ and −θ. Angles θ/2 and 3θ/2 could also be used. A variety of angle combinations may be used with comparable results, depending on a general structure and relative horizontal and vertical positions of the various components of the display system 200.

Collimated light emitted from the light source 202 impinge on the intensity modulation matrix 204, where image lines are formed. FIG. 2a shows a side elevation view of the display system 200 and, consequently, image lines L1-L6 and R1-R6 are shown as uni-dimensional arrows. It should be understood that each line L1-L6 and R1-R6 represents an actual image row having a length across a width of the display system 200. It should also be understood that a typical image may comprise a much larger number of image rows than as shown, for example 1080 lines for a high definition application.

At interval T1, light impinges on a row $204_3$ of the intensity modulation matrix 204 and becomes a right line R1. The intensity modulation matrix 204, which may for example be an LCD panel, comprises a pixel by pixel, Red-Green-Blue (RGB) arrangement, as is well-known in the art.

Still during interval T1, light of the right line R1 is then transmitted from the intensity modulation matrix 204 to the patterned retarder 206, which may for example be a horizontal patterned retarder layer. The patterned retarder 206 also comprises a plurality of lines, matching the number of lines emitted by the intensity modulation matrix 204. Odd lines and even lines of the patterned retarder 206 have spatially alternating polarizations and may modify a polarization of received light. In one embodiment, a polarization of light passing through odd lines of the patterned retarder 206 remains unmodified while a polarization of light passing through even lines of the patterned retarder 206 is shifted by 90 degrees. This embodiment of the patterned retarder 206 may be called a half wave retarder. In another embodiment the polarization of light passing through odd lines of the patterned retarder 206 is converted to a left-hand circular polarization while the polarization of light passing through even lines of the patterned retarder 206 is converted to a right-hand circular polarization. This embodiment of the patterned retarder 206 may be called a patterned quarter wave retarder. In all cases, right lines are emitted from the patterned retarder 206 at a first polarization state while left lines are emitted at a second polarization state.

Continuing with a description of interval T1, light of the right line R1 is then transmitted to the display layer 208. The display layer may for example be a non-depolarizing diffuser. One function of the diffuser is to remove the collimated aspect of the light, dispersing the light so that a resulting image may be viewed with minimal distortion from a wide angular position range relative to the display system 200. As shown at the bottom of FIG. 2a, line R1 is displayed on a line $208_1$, which is a first line of the display layer 208.

At interval T2, light emitted from the light source 202 is now a left line L1 after going through a row $204_1$ of the intensity modulation matrix 204. Light of the left line L1 is then transmitted to the patterned retarder 206 and passes through line $206_2$ of the patterned retarder 206. A polarization of the line L1 may be modified as explained hereinabove. L1 polarization does assume a complementary polarization with that of line R1, at interval T1. Light of the left line L1 is then transmitted to the display layer 208 and appears on the line $208_1$.

From the above description of FIG. 2a, it may be observed that a given line of the display layer 208 alternatively shows a left and then a right image line, corresponding to a same line number of original images. For example, line $208_6$ of the display layer 208 alternates between image lines L6 and R6.

It may also be observed that collimated light impinging on a given row of the intensity modulation matrix 204 during interval T1, for example row $204_3$, is transmitted to row $206_3$ of the patterned retarder 206. Light impinging on the same row $204_3$ of the intensity modulation matrix 204 during interval T2 is then transmitted to row $206_4$ of the patterned retarder 206. A relationship between a given row of the intensity modulation matrix 204 and rows of the patterned retarder 206 thus skips by one patterned retarder row between intervals T1 and T2.

It may further be observed that a few lines, or rows, of the polarization matrix panel 204 and of the patterned retarder 206 are left unused during one interval or the other. For example, lines $204_1$ and $204_2$ of the polarization matrix panel 204 are not illuminated during interval T1. In one embodiment, the polarization matrix panel 204 may comprise a small number of additional lines, on top of a number of image lines to be displayed. In another embodiment, for example when it is desired to use a standard 1920×1080 pixel LCD panel, a very small number of topmost and bottommost image lines as displayed on the display layer 208 may be sacrificed.

Figure 2B:
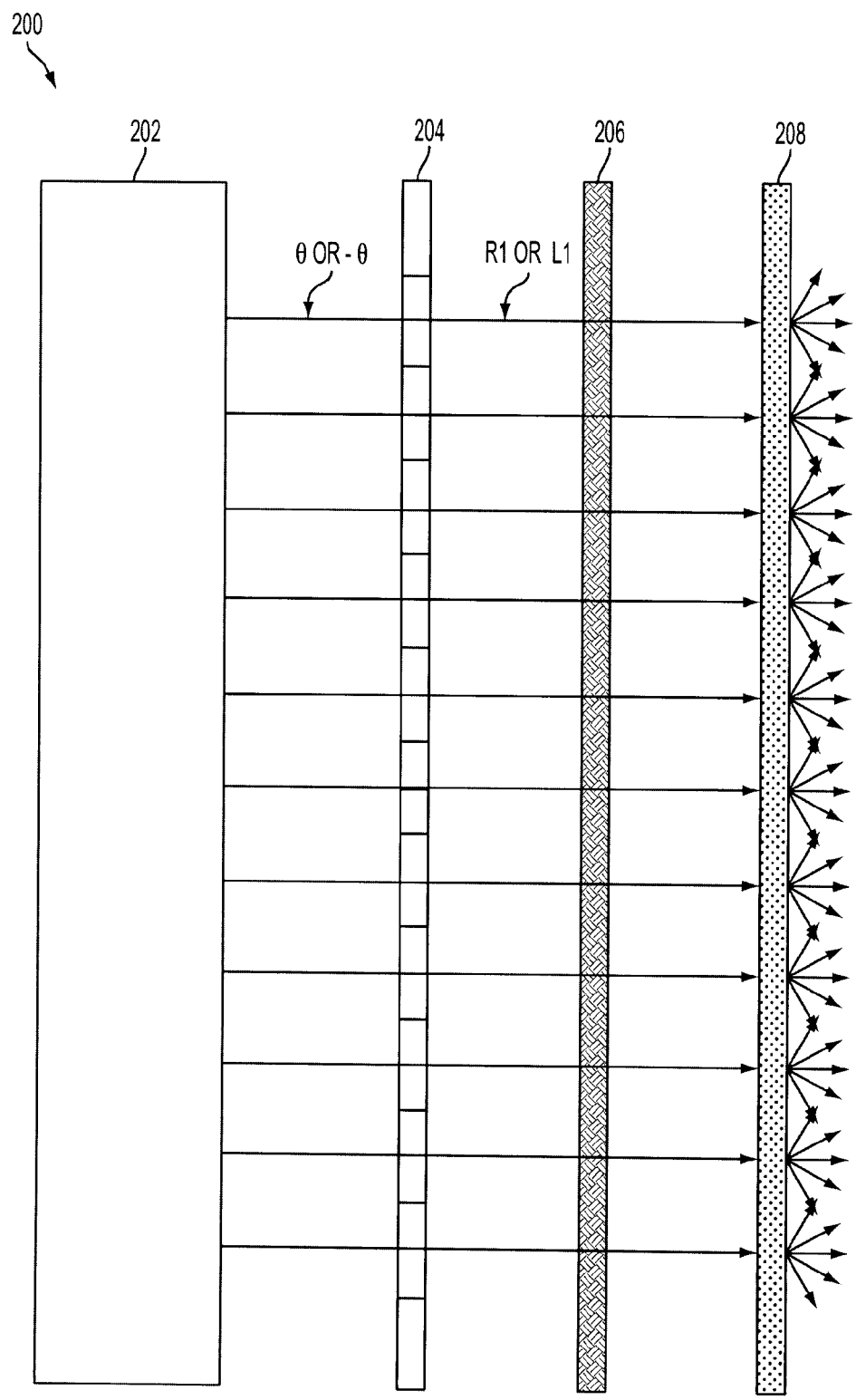

FIG. 2b is a schematic, top plan view of the display system of FIG. 2a. The same display system 200 as introduced in the description of FIG. 2a is shown on FIG. 2b. Only a top image line, which may be R1 during interval T1 or L1 during interval T2, is shown. It may be observed that light is emitted from the light source 202 on complete lines, or rows. In the display system 200, light is collimated both in the horizontal and vertical planes, as shown by parallel light arrows such as L1 and R1.

Those of ordinary skill in the art will appreciate that traditional television images are displayed as a series of horizontal lines, or rows. Of course, the display system 200 could be configured for alternatingly displaying columns corresponding to left and right images. In such a configuration, FIG. 2a would constitute a top plan view of the display system 200 while FIG. 2b would constitute a side view thereof. Consequently, an image line may either extend along a horizontal axis or along a vertical axis of the image. The terms "rows" or "lines" as used herein are thus not limited to horizontal image lines and may represent vertical lines. This implies that rows, or lines, of the intensity modulation matrix 204, of the patterned retarder 206 and of the display layer 208 may either be horizontal or vertical.

Figure 3A:
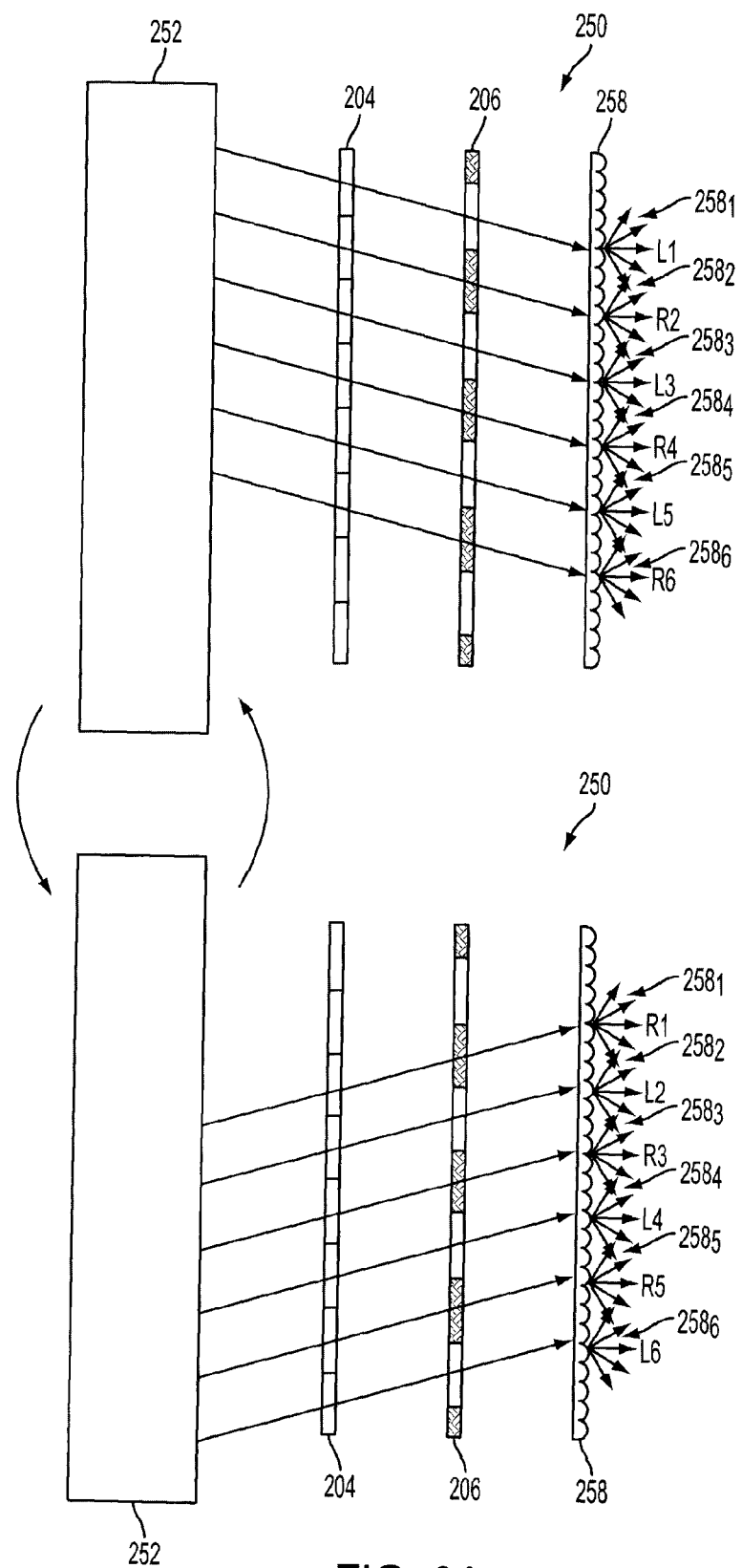
FIG. 3a is a schematic, side elevation view of a display system according to another embodiment.
Figure 3B:
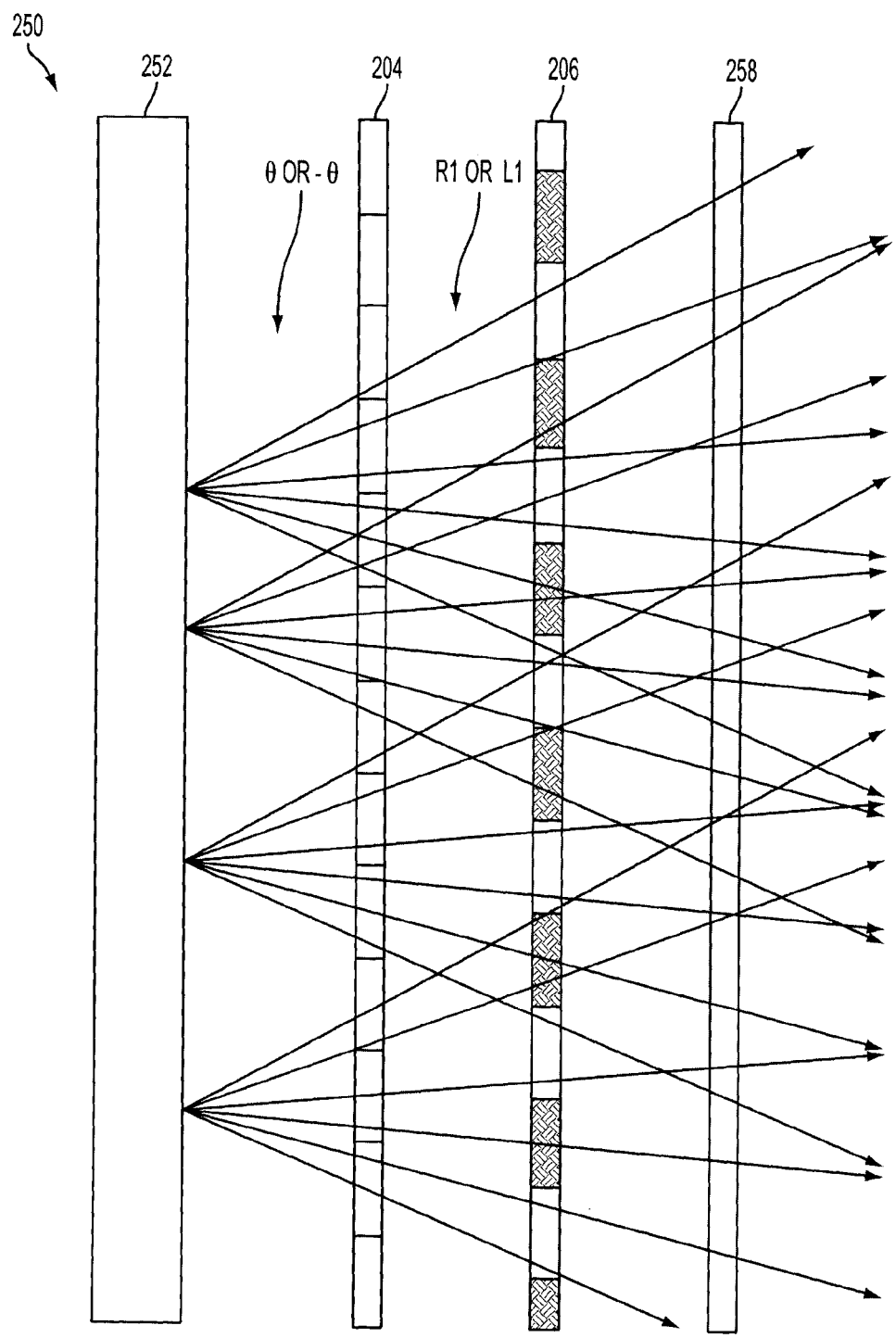

FIG. 3a is a schematic, side elevation view of a display system according to another embodiment. FIG. 3b is a schematic, top plan view of the display system of FIG. 3a. A display system 250 is very similar to the display system 200 of FIGS. 2a and 2b. Differences lie in the presence a simpler light source 252 and of a different type of display layer 258. The display layer 258 is arranged as a lenticular lens having rows $258_i$. As shown on FIG. 3b, in the display system 250, light from the light source 252 is not collimated in the horizontal plane, as shown by diverging light arrows identified on FIG. 3b as L1 and R1.

Figure 4:
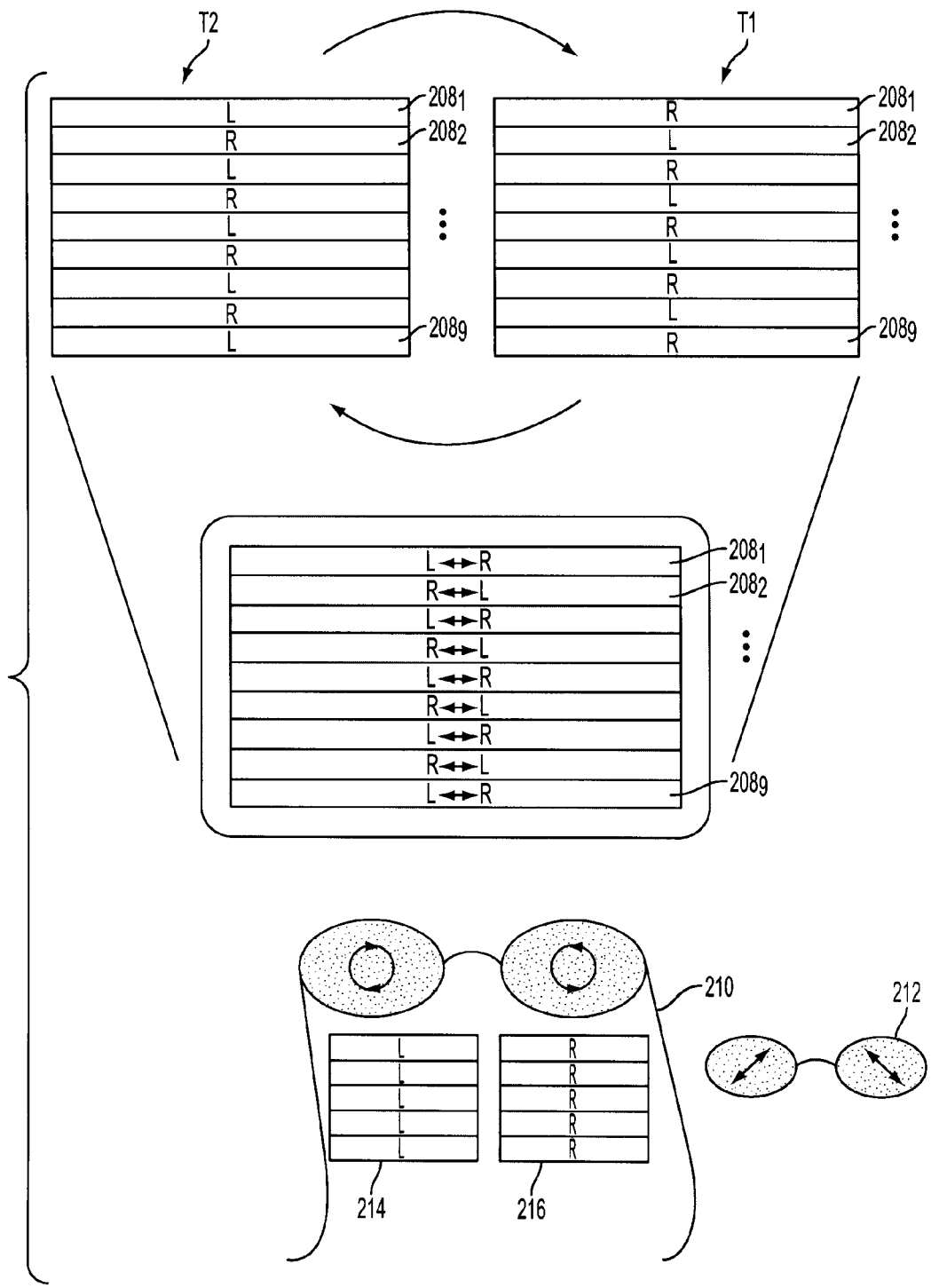
FIG. 4 is an illustration of a manner of viewing two complementary images, according to an embodiment.

FIG. 4 is an illustration of a manner of viewing two complementary images, according to an embodiment. The top of FIG. 4 reproduces image lines as visible on the display layer 208, at interval T2 on the left, and at interval T1 on the right. Though only 9 lines are shown, it is understood that a particular embodiment may comprise a much larger number of image lines. A middle part of FIG. 4 provides a complementary view of the display layer 208, showing how each line alternates between left and right image lines, odd-numbered lines being right lines while even-numbered lines become left lines, and vice-versa. Circularly polarized viewing glasses 210 or linear polarized viewing glasses 212 may be worn by a user. Each type of glasses comprises first and second optical components having complementary polarization for discriminating between right lines, which have the first polarizing angle, and left lines, which have the second polarizing angle shifted by 90 degrees when compared to the first polarizing angle. The viewing glasses 210 or 212 allow a user to see, on a left side, a first image 214 having rows according to a first polarization and see, on a right side, a second image 216 having rows according to a second polarization.

It may be observed that virtually each odd and even line of the display layer 208 display an image line, in a continuous and uninterrupted fashion, with the possible exception of a few topmost or bottommost lines in some embodiments.

Figure 5:
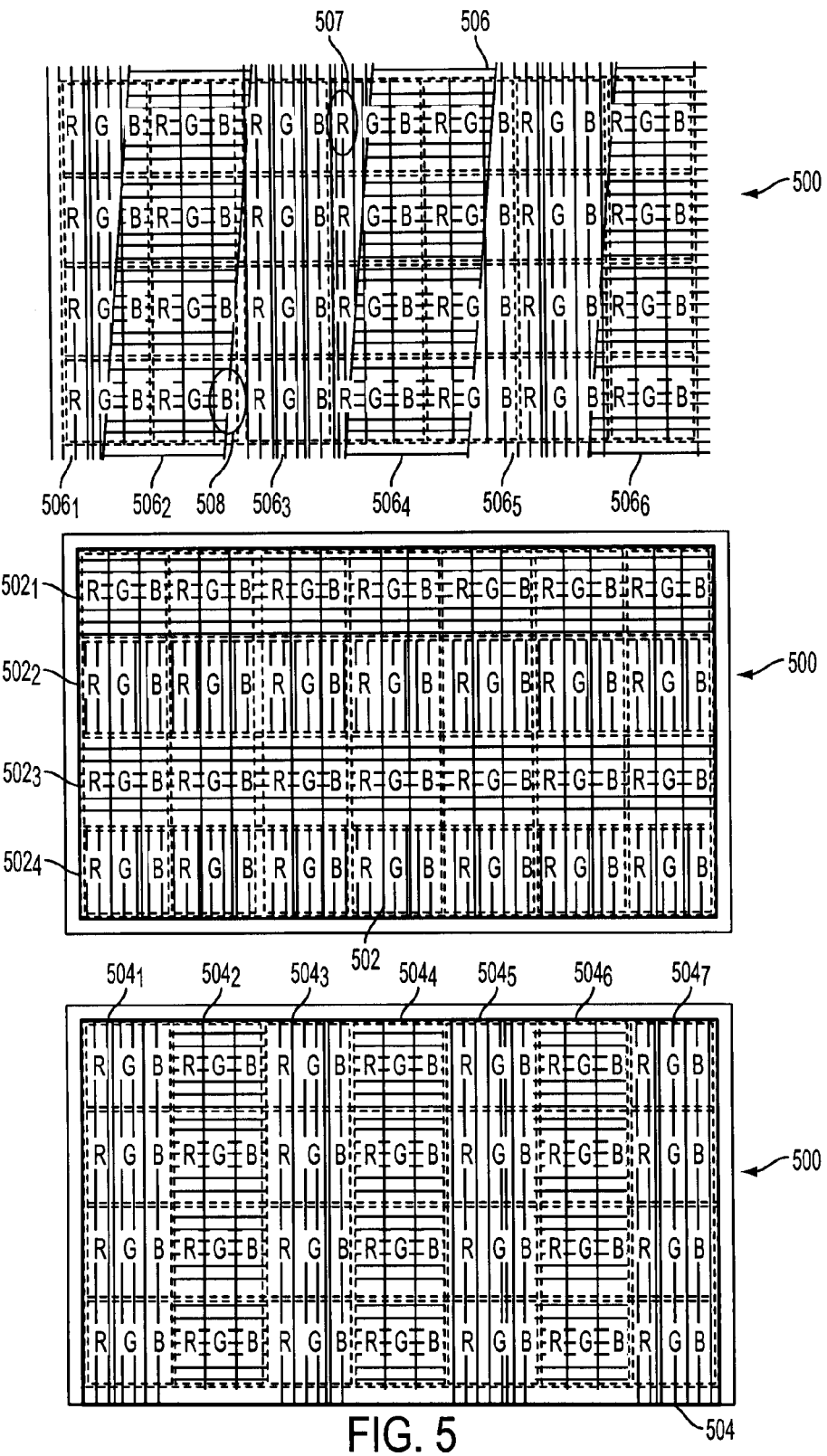
FIG. 5 is a schematic view of image pixels organized on rows or columns.

FIG. 5 is a schematic view of image pixels organized on rows or columns. An intensity modulation matrix 500 comprises a 7×4 RGB pixel matrix. Corresponding patterned retarders 502, 504 and 506 are shown, representing three distinct embodiments. In the middle part of FIG. 5, the patterned retarder 502 comprises rows $502_{1-4}$ that alternatively apply a shifting polarization to rows of the intensity modulation matrix 500. In the bottom part of FIG. 5, the patterned retarder 504 comprises columns $504_{1-7}$ that alternatively apply a shifting polarization to columns of the intensity modulation matrix 500. The embodiment shown at the top of FIG. 5 comprises the patterned retarder 506 having columns $506_{1-7}$ that alternatively apply a shifting polarization to columns of the intensity modulation matrix 500. In this particular embodiment, the patterned retarder 506 is not perfectly aligned with the intensity modulation matrix 500. This misalignment may reduce a resulting image quality, but may be corrected, at least partially, by blocking or turning off, for example, pixels 507 and/or 508, so that image imperfections are reduced. Loss of light due to turned off pixels may be at least partially compensated by increasing an adjacent, same color sub-pixel.

Those of ordinary skill in the art will readily appreciate that, among possible variants of the patterned retarders of FIG. 5, one embodiment may, rather than defining horizontal rows or vertical columns, assign distinct patterned retarder polarizations on a pixel-wise basis, giving the PRL a checkered pattern. They will also appreciate that a high definition screen may comprise, for example, a 1920×1080 pixel matrix configured in the same or equivalent manner as the pixel matrix 500 illustrated on FIG. 5.

Figure 6:
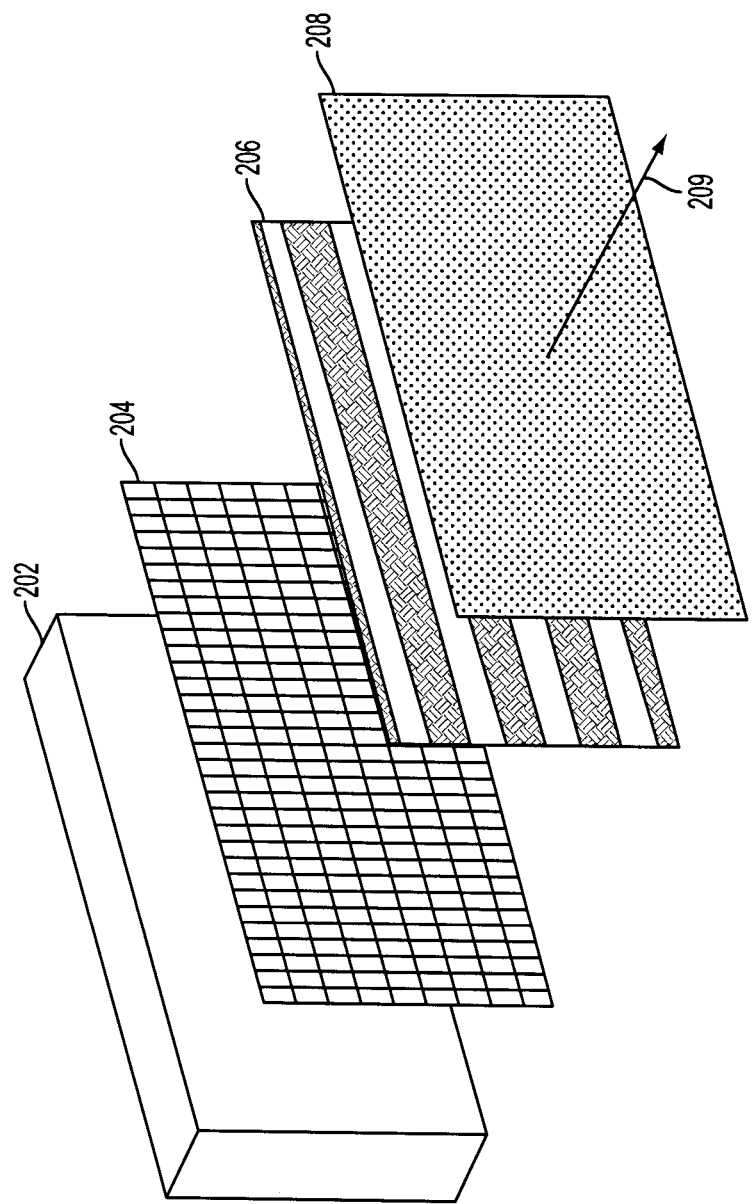

FIG. 6 is a schematic, perspective view of the display system of FIG. 2a. FIG. 6 is not to scale. Arrow 209 shows a general direction of light emission.

Figure 7:
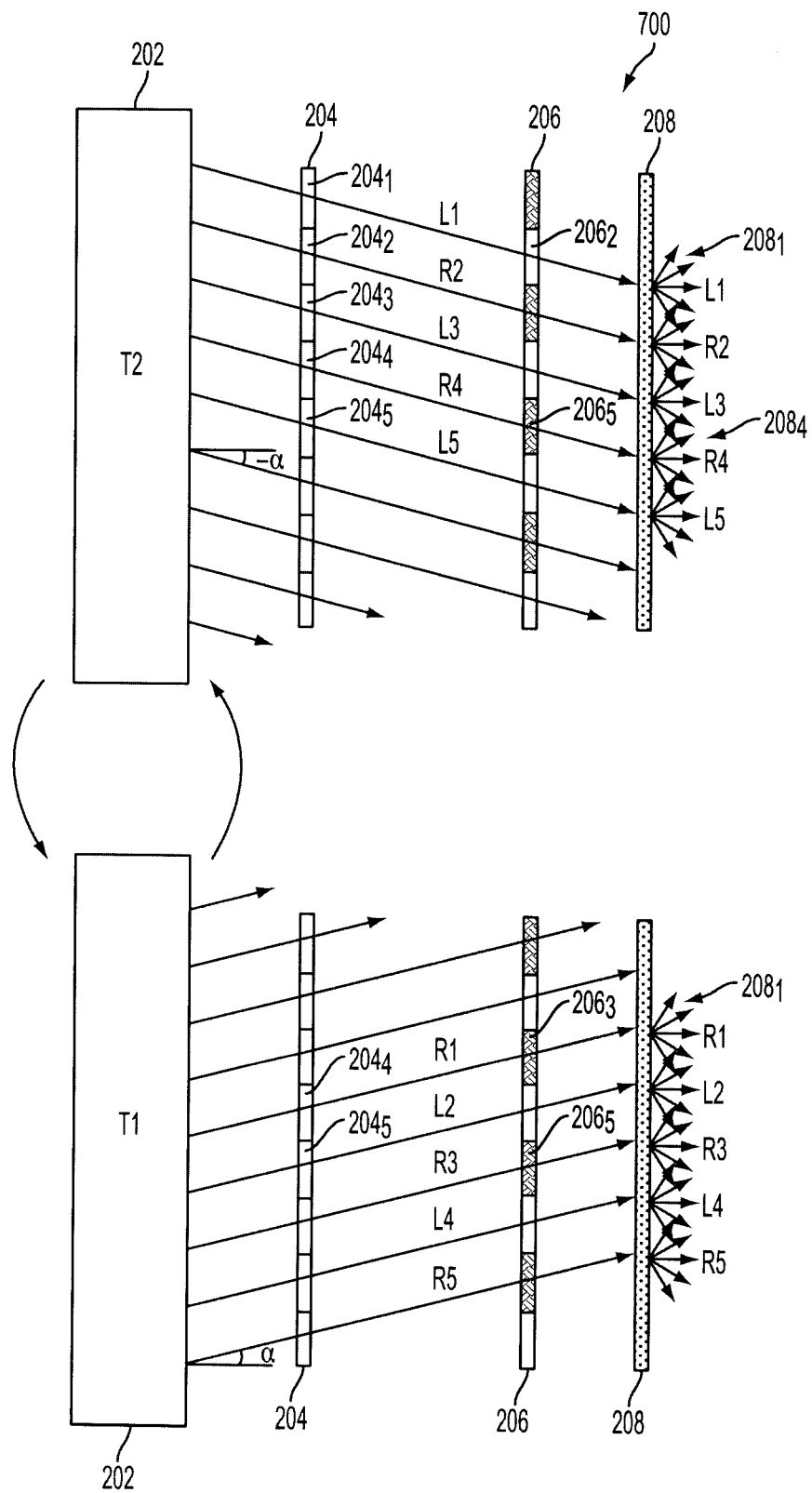
FIG. 7 is a schematic, side elevation view of a display system according to a further embodiment.

FIG. 7 is a schematic, side elevation view of a display system according to a further embodiment. A display system 700 is similar to the display system 200 introduced in the foregoing description of FIG. 2a, and comprises similar elements. A distinction lies in a distance between the intensity modulation matrix 204 and the patterned retarder 206. For example, a distance between the patterned retarder 206 and the display layer 208 may be set to 0.8 mm, while a distance between the intensity modulation matrix 204 and the patterned retarder 206 may be set to 1.6 mm. Collimated light is emitted by the light source 202, at a first angle α during T1 and at a second angle −α during T2. Angles α and −α as shown on FIG. 7 may differ from angles θ and −θ of FIGS. 2a and 3a. In various embodiments, actual angle values may need to be determined according to relative sizes and positions of the various components of the display systems 200, 250 and 700. Determination of proper angle values is within the capabilities of those of ordinary skill in the art. During interval T1, light impinges on the intensity modulation matrix 204, on row $204_4$, and forms right image line R1, which is transmitted through the patterned retarder 206 on row $206_3$, and is then displayed on the display layer 208, on row $208_1$. During interval T2, light impinges on the intensity modulation matrix 204 on the same row $204_4$, forms right image line R4, which is transmitted through the patterned retarder 206 on row $206_5$, and is then displayed on the display layer 208, on row $208_4$. A consequence of this arrangement is that even numbered rows of the intensity modulation matrix 204, for example row $204_4$, consistently transmit right image lines while odd numbered rows of the intensity modulation matrix 204 consistently transmit left image lines. This arrangement reduces crosstalk between left and right images, such crosstalk being sometimes due to liquid crystal response time known to cause LCD motion blur and stereo crosstalk on active glass 3D LCD screens.

It may also be observed that collimated light impinging on a given row of the intensity modulation matrix 204 during interval T1, for example row $204_4$, is transmitted to row $206_3$ of the patterned retarder 206. Light impinging on the same row $204_4$ of the intensity modulation matrix 204 during interval T2 is then transmitted to row $206_5$ of the patterned retarder 206. A relationship between a given row of the intensity modulation matrix 204 and rows of the patterned retarder 206 thus skips by two patterned retarder rows between intervals T1 and T2. This compares with a shift of one patterned retarder row of the patterned retarder 206 in the embodiments of FIGS. 2a and 3a.

Figure 8:
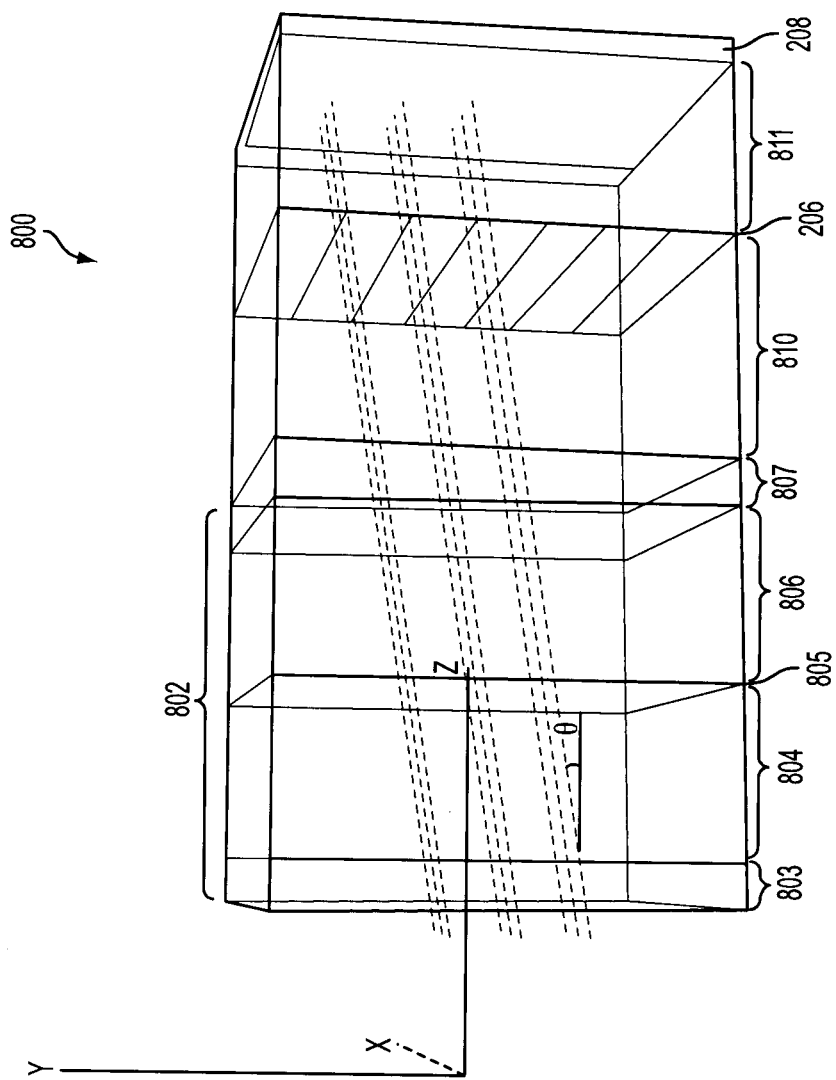
FIG. 8 is a scaled, partial perspective view of an example of display system showing light emission at a first angle.

FIG. 8 is a scaled, partial perspective view of an example of display system showing light emission at a first angle. An exemplary display system 800 is built generally according to the structure introduced in relation to FIG. 2a, in terms of distances between the various components. The display system 800 comprises, as an intensity modulation matrix, a LCD 802. The exemplary LCD 802 is further split into a 0.2 mm thick first polarizer 803, a 0.7 mm first glass panel 804, a 0.01 mm matrix 805, a 0.7 mm second glass panel 806, and a 0.2 mm second polarizer 807. Of course, other LCD constructions may be alternatively used. Other types of intensity modulation matrixes, for example other types of light valve matrices, may substitute for the LCD 802. The display system 800 further comprises a 0.7 mm first glass or transparent plastic spacer 810, the patterned retarder 206 of earlier Figures, being for example a 0.01 mm thick patterned retarder, a 0.7 mm second glass or transparent plastic spacer 811 and the display layer 208, being for example a 0.1 mm thick diffuser. The exemplary dimensions presented herein are suitable for a 24-inch high definition screen, having a pixel pitch of approximately 0.2715 mm. FIG. 8 represents the display system 800 during time interval T1, when collimated light from the light source 202 (shown on earlier figures) impinges on the LCD 802 at the first angle θ. Other embodiments may suit any display size and any pixel pitch, applicable to hand-held displays and to large size television screens alike.

Figure 9:
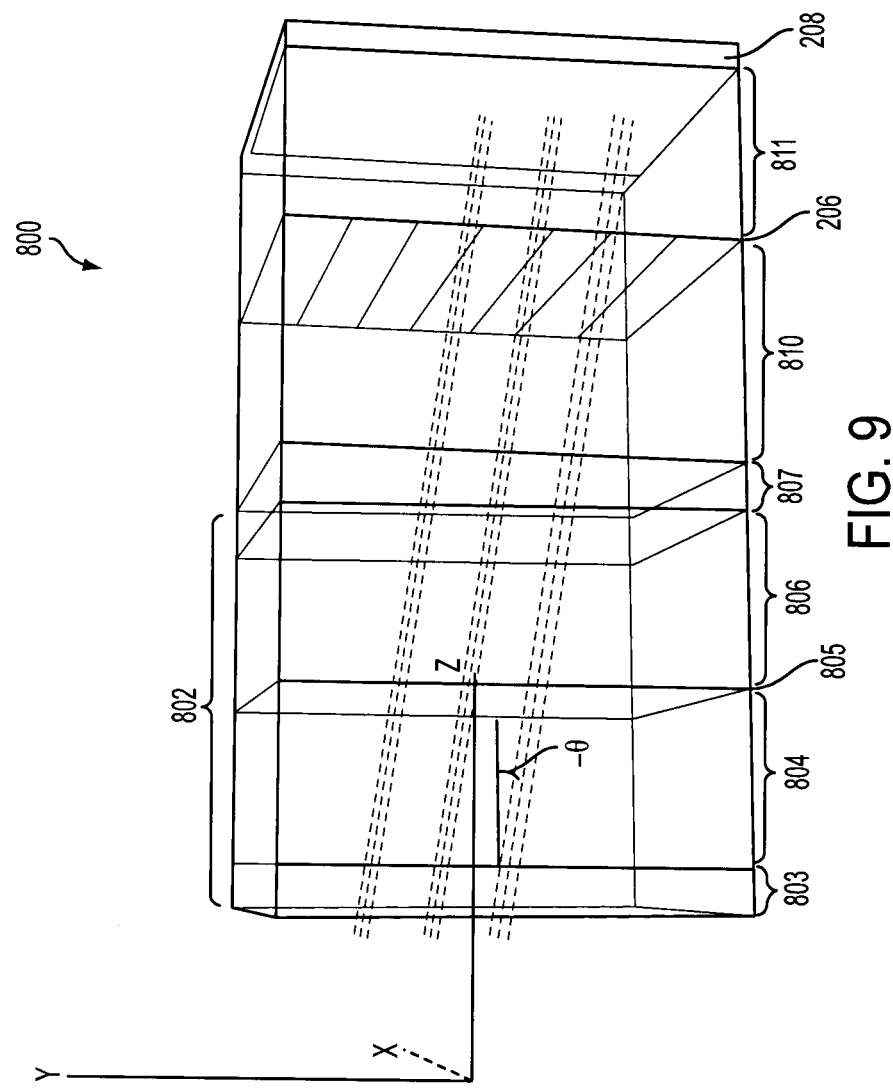
FIG. 9 is a scaled, partial perspective view of the display system of FIG. 8 showing light emission at a second angle.

FIG. 9 is a scaled, partial perspective view of the display system of FIG. 8 showing light emission at a second angle. When compared to FIG. 8, it may be seen on FIG. 9 that collimated light impinges on the LCD 802 at the second angle −θ.

Figure 10:
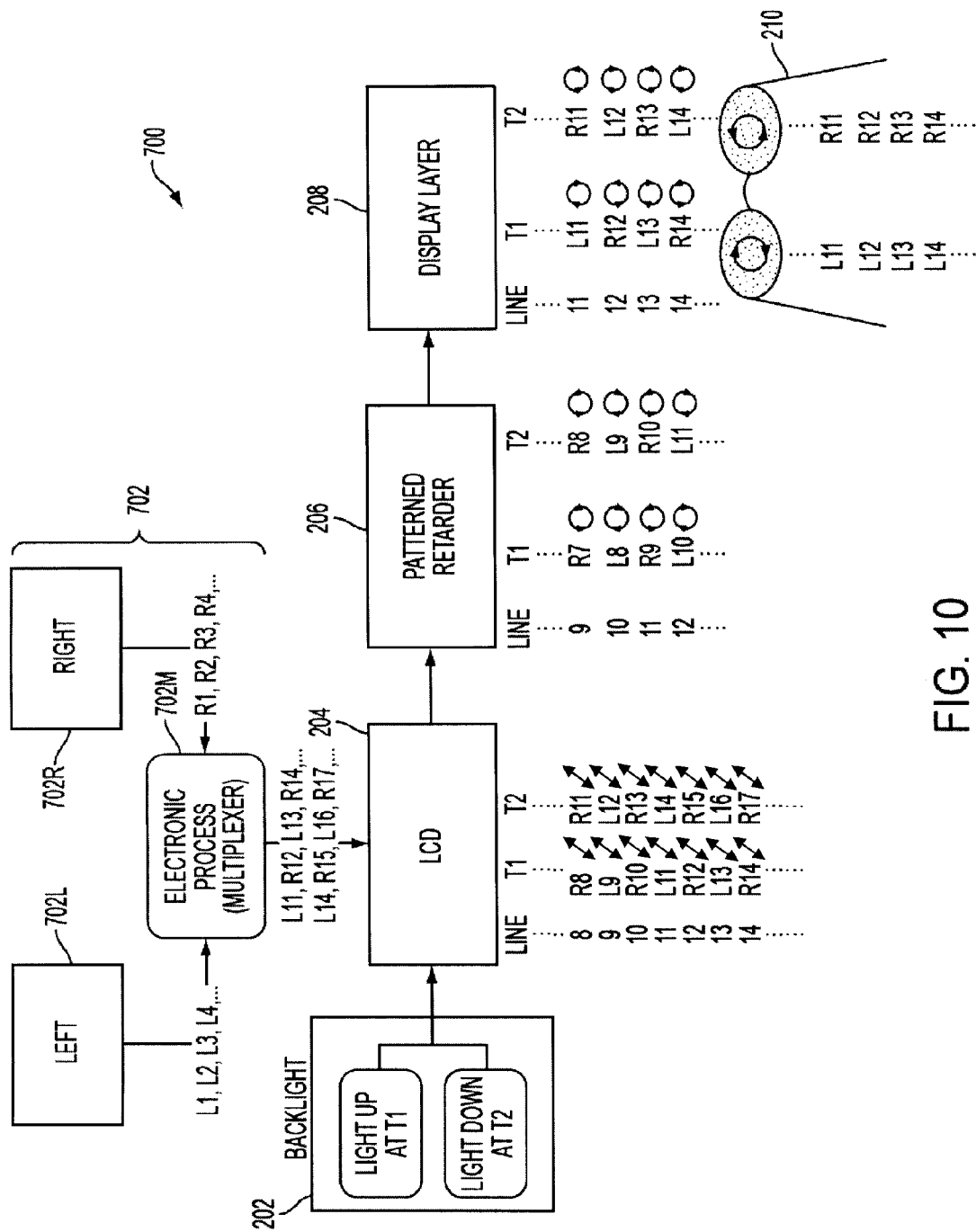
FIG. 10 is a block diagram of the display system of FIG. 7.

FIG. 10 is a block diagram of the display system of FIG. 7. In the embodiment as shown on FIG. 10, the light source 202 is a backlight, the intensity modulation matrix 204 is an LCD panel, and the display layer 208 is called an image formation layer; this specific embodiment is for illustration purposes and is not intended to limit the present disclosure. The display system 700 further comprises an image source 702, which is inherently present in the previously described display systems, but has not been described hereinabove. The image source 702 provides electrical signals to the intensity modulation matrix 204, for defining image contents. The image source 702 further comprises left and right image sources 702L and 702R, and a multiplexer 702M.

In operation, image information for forming left lines L1-L4 . . . and right lines R1-R4 . . . , from the left and right image sources 702L and 702R respectively, is fed into the multiplexer 702M. The multiplexer 702M outputs image information according to the following sequence: During time interval T1, odd numbered left image lines L1, L3, L5 . . . are interlaced with even numbered right image lines R2, R4, R6 . . . for polarization, by the intensity modulation matrix 204, of collimated light emitted upwardly, for example at the first angle α. During time interval T2, even numbered left image lines L2, L4, L6 . . . are interlaced with odd numbered right lines R1, R3, R5 . . . for polarization, by the intensity modulation matrix 204, of collimated light emitted downwardly, for example at the second angle −α. Owing to the particular configuration described in relation with FIG. 7, in which the distance between the intensity modulation matrix 204 and the patterned retarder 206 is double the distance between the patterned retarder 206 and the display layer 208, even rows on the intensity modulation matrix 204 consistently transmit (for example) right image lines while odd rows on the intensity modulation matrix 204 consistently transmit (for example) left image lines.

Given lines on a quarter wave patterned retarder are capable of polarizing light according to either one or the other of two polarizations, successive rows of the quarter wave patterned retarder alternating between a left-hand and a right-hand circular polarization. Consequently, given lines of the patterned retarder 206 consistently transmit either left or right lines. Each line on the display layer 208 alternates between corresponding left or right images, for a same line number.

Image lines outputted from the intensity modulation matrix 204 share a common polarization angle, as shown on FIG. 10. Circular polarization is applied, in the present example, within patterned retarder 206 of the display system 700, and circularly polarized viewing glasses 210 are worn by a viewer. Linear polarization within the display system 700 and use of linear polarized viewing glasses may of course be used in some embodiments.

Those of ordinary skill in the art will appreciate that embodiments of the method and display system as disclosed herein, owing to the capability to concurrently show two complementary images, may be applied to other uses besides stereoscopic imaging. It is thus possible to use a first and second image for other uses besides 3D image viewing. For example, in a gaming application, two distinct users may be presented with distinct two-dimensional (2D) images, each of which being intended for viewing by one of the users. For such applications, glasses worn by the users differ from glasses 210 or 212 of FIG. 4 in that each pair comprises, on both eyes, one or the other of the complementary polarizing filters allowing, viewing one or the other of the two displayed images. For applications involving complementary 2D images, the present disclosure may be more easily understood by replacing mentions of "left" and "right" with "viewer 1" and "viewer 2".

Figure 11:
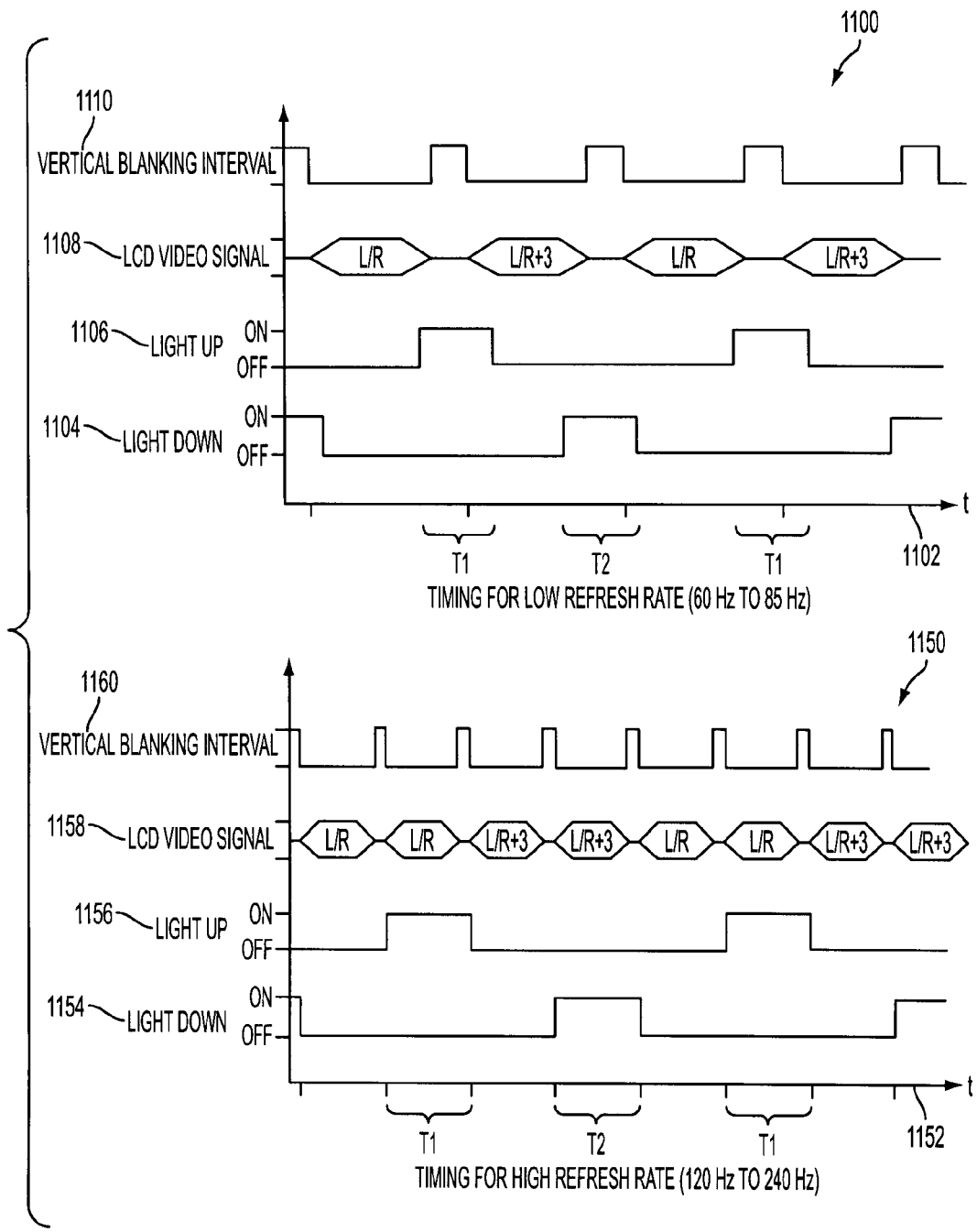
FIG. 11 is a timing diagram applicable to the display system of FIG. 7.

FIG. 11 is a timing diagram applicable to the display system of FIG. 7. A first timing diagram 1100 is mainly applicable for video display systems having a fairly low refresh rate, while a second timing diagram 1150 is mainly applicable when a high refresh rate is used. Horizontal time axes 1102 and 1152 illustrate passing time while several concurrent signals are shown on vertical axes. Lines 1104 and 1154 shown on/off sequences of collimated light emitted at a downward angle −α. Lines 1106 and 1156 shown on/off sequences of collimated light emitted at an upward angle α. Lines 1108 and 1158 show contents of electrical inputs from the image source 702, updating pixel rows on the intensity modulation matrix 204, which may be an LCD panel. Lines 1110 and 1160 show intervals where vertical blanking is applied. Vertical blanking corresponds to moments when the LCD is not updated.

Returning to FIG. 7, row 204₄ of the intensity modulation matrix 204 emits image row R1 during interval T1 and image row R4 during interval T2. An equivalent shift of three (3) rows is visible on row 204₅, between image row L2 at interval T1 and row L5 at interval T2. Considering the second timing diagram 1150 of FIG. 11, this corresponds to a shift of 3 left and right rows, for the same time intervals T1 and T2.

The timing diagram 1100 differs from diagram 1150 mainly in terms of refresh rate of the intensity modulation matrix 204. It is understood that a given pixel of the LCD panel continues emitting according to a previous electrical input when no input is being received, at times of vertical blanking. Though the line 1108, representing the electrical input into the LCD panel, is mainly empty at times of light up, interval T1, and at times of light down, interval T2, rows of image pixels are indeed present on the LCD panel.

Figure 12:
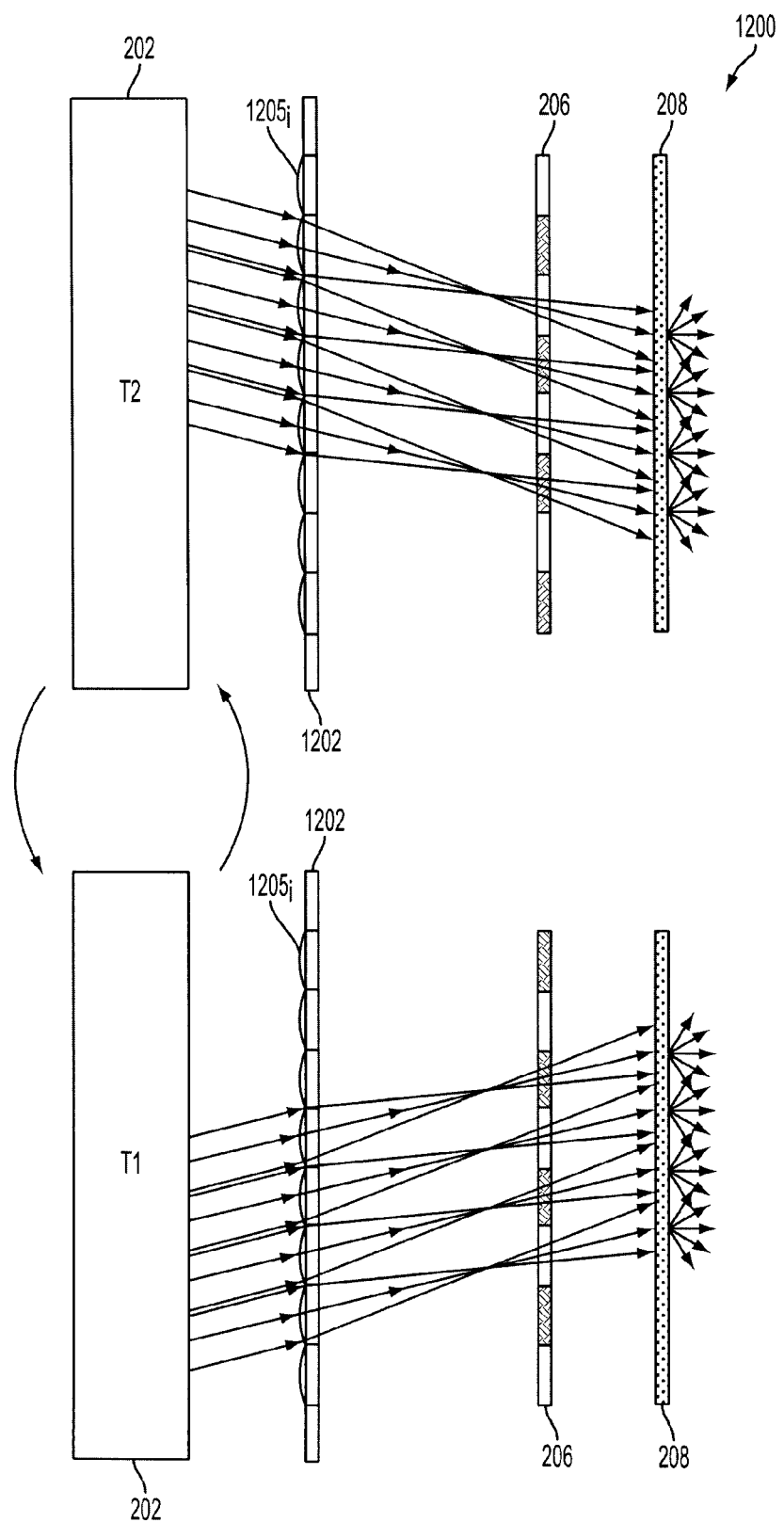
FIG. 12 is a schematic, side elevation view of a display system according to a further embodiment.

FIG. 12 is a schematic, side elevation view of a display system according to a further embodiment. A display system 1200 is, in many aspects, similar to the display system 700 introduced in the foregoing description of FIG. 7. The intensity modulation matrix 204 of the preceding Figures is replaced by a intensity modulation matrix 1202 having lengthwise focusing lenses 1205ᵢ on each row of a receiving side of the intensity modulation matrix 1202. Operation and structure of the display system 1200 is similar to that of the display system 700. However, addition of the focusing lenses 1205ᵢ reduces requirements on the light source 202. Collimated light from the light source 202 may suffer from a moderate angle variation, for example a plus or minus 5 degree angle variation, without creating significant crosstalk, thanks for the effect of the focusing lenses 1205ⱼ. Of course, a variant of the display system 1200 may be similar to the display system 200 of FIG. 2a and may set a same distance, on one hand, between the intensity modulation matrix 1202 and the patterned retarder 206 and, on the other hand, between the patterned retarder 206 and the display surface 208.

Figure 13:
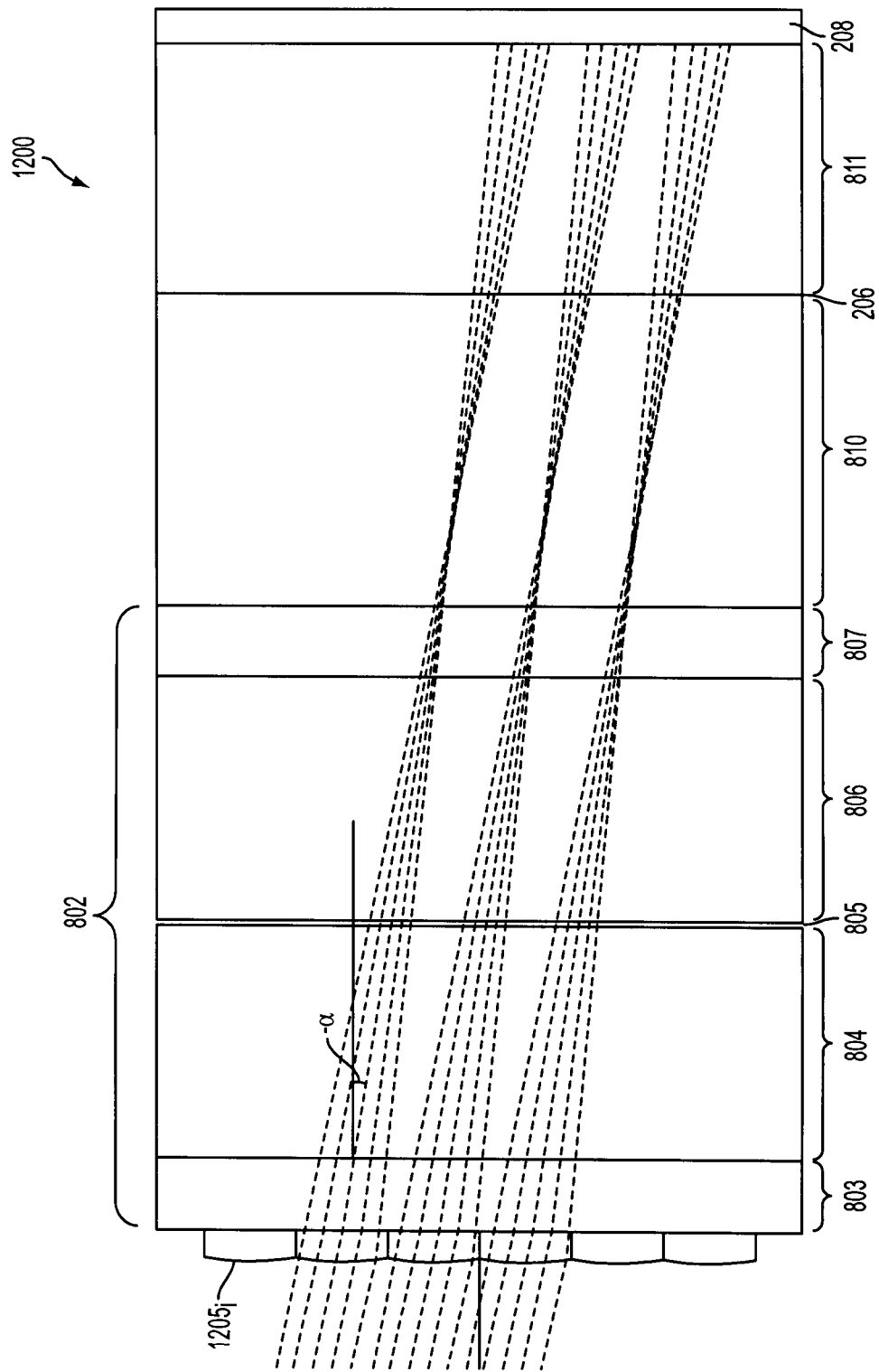
FIG. 13 is a scaled, side elevation view of the display system of FIG. 12.
Figure 14:
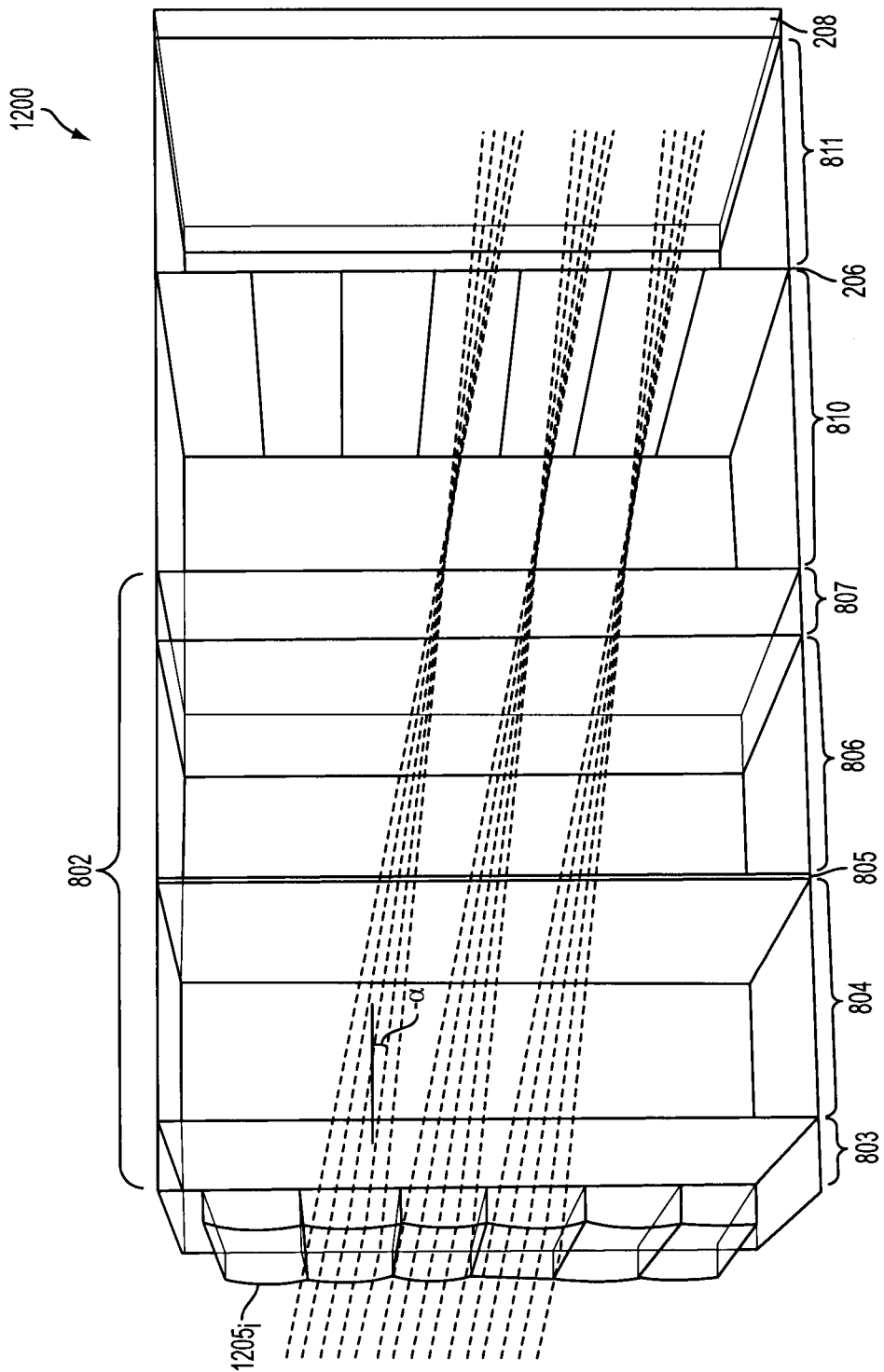
FIG. 14 is a scaled, partial perspective view of the display system of FIG. 12.

FIG. 13 is a scaled, side elevation view of the display system of FIG. 12. FIG. 14 is a scaled, partial perspective view of the display system of FIG. 12. FIGS. 13 and 14 illustrate variants of the system 1200 using an LCD 802 as in FIGS. 8 and 9, in addition to the focusing lenses 1205ⱼ. FIGS. 13 and 14 both illustrate how somewhat unfocussed collimated light received on the intensity modulation matrix 1202 is brought into better focus by the focusing lenses 1205ⱼ. Both FIGS. 13 and 14 illustrate light emission during a time interval T2, collimated light being generally received at the second angle −α, with some variation around the value −α.

Various embodiments of the display system, as disclosed herein, may be envisioned. One such embodiment may comprise a full resolution polarized stereoscopic display system using a single LCD panel receiving two alternately collimated light beams from a backlight, a patterned retarder layer, and diffuser layer. Another such embodiment may comprise a full resolution polarized stereoscopic display system using a single LCD panel receiving two alternately collimated light beams, light being collimated only along a vertical axis, a vertical patterned retarder layer and a lenticular layer. A variant may comprise two light beams collimated horizontally and a horizontal patterned retarder layer. Yet another such embodiment may comprise a full resolution polarized stereoscopic display system using a single LCD panel, receiving two alternately collimated light beam, a patterned retarder layer and diffuser layer.

Embodiments of a method for concurrently displaying first and second images on a display surface are disclosed herein. Accordingly, the first and second images are formed of respective even lines in a first polarized state and odd lines polarized at an orthogonal polarization state, during a first time interval, and opposite polarizations during a second time interval, forming a complete first image at one polarization state and a complete second image polarized at an orthogonal polarization state. Embodiments of the method use dual collimated light received from a light source, an intensity modulation matrix, a patterned retarder layer and a display surface arranged to show two polarization states at alternate lines at a first time interval and, alternatively, inverting polarization states in a second time interval. A LCD pixel matrix may be used as the intensity modulation matrix.

In display systems and methods as disclosed herein, a line arrangement, distances between the LCD pixel matrix, the patterned retarder layer and the diffuser layer, as well as two angles of the collimated light, are all calculated in such a way that light for a given image row, arriving at a first angle through a first line of LCD pixels and through the patterned retarder layer, hits the diffuser surface at a same row location as light for the same image row, arriving at a second angle going though a second line of LCD pixels and through the patterned retarder layer.

Images as emitted at the LCD are shifted up and down between time intervals so that a same row of information arrives at the diffuser at the same row location. In a first time interval, image lines are interlaced on the diffuser at every row, with left and right information being respectively displayed on odd and even lines. Then, in a second interval, left and right lines are respectively displayed on even and odd lines.

It may be observed throughout the present disclosure that arrangement of the various components is made so that information is alternatively displayed by the LCD to match the patterned retarder layer. Arrangement of the LCD, patterned retarder layer, diffuser and the two angles of the received light may be such that one LCD row alternatively displays left and right image information. Another arrangement may make one LCD row always display left image information and a next row above or below always display the right image information.

The patterned retarder layer may be a quarter wave retarder, in which the fast axes of odd rows are at +45 degrees from the LCD polarizer angle and the even rows are at −45 degrees from the same LCD polarizer angle. The light hitting a row location of the diffuser from the first angle passes through the patterned retarder layer, where fast axes may have right-handed circular polarization, and the light hitting the same diffuser row location from the second angle passes through the patterned retarder layer, where the fast axes are orthogonal to the previous one, in this case having a left-handed circular polarization. Alternatively, the patterned retarder may be a half wave retarder, either bringing no retardation or half wave retardation, alternating on each row of the patterned retarder layer. Regardless, light hitting the diffuser is alternately polarized at two orthogonal angles.

As shown at the top of FIG. 5, in some embodiments, the patterned retarder layer may be oriented at a small angle from vertical. Given the patterned retarder layer a somewhat higher pitch compared to a LCD pixel pitch helps maintaining horizontal light beams.

An image displayed by the LCD may be pre-processed to compensate for a difference of a LCD response at the two light source angles.

A rectangular lens array may be positioned in front of the LCD, to concentrate the collimated light source arriving at a pixel row within the associated row of the patterned retarder layer.

Those of ordinary skill in the art will realize that the description of the devices and methods for concurrently showing complementary images are illustrative only and are not intended to be in any way limiting. Other embodiments will readily suggest themselves to such persons with ordinary skill in the art having the benefit of the present disclosure. Furthermore, the disclosed methods and display systems may be customized to offer valuable solutions to existing needs and problems of 3D imaging and of gaming applications.

In the interest of clarity, not all of the routine features of the implementations of the display systems and methods therefor are shown and described. It will, of course, be appreciated that in the development of any such actual implementation of the display systems, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of electronic displays having the benefit of the present disclosure.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for concurrently displaying a first image and a second image, comprising:
   receiving, on an intensity modulation matrix, collimated light impinging on the intensity modulation matrix at two angles alternating over time;
   transmitting the collimated light from the intensity modulation matrix to a patterned retarder comprising successive rows applying spatially alternating polarizations; and
   transmitting the collimated light from the patterned retarder to a display layer;
   whereby a given row on the display layer alternates over time between light having a first polarization and light having a second polarization.

2. The method of claim 1, wherein the first image comprises a first plurality of rows according to the first polarization and the second image comprises a second plurality of rows according to the second polarization.

3. The method of claim 2, wherein the first plurality of rows is interlaced with the second plurality of rows.

4. The method of claim 1, wherein the first image and the second image form a stereoscopic image.

5. The method of claim 1, wherein the first image and the second image are for viewing by distinct users.

6. The method of claim 1, comprising:
   receiving, on a first row of the intensity modulation matrix, first collimated light impinging on the intensity modulation matrix at a first angle;
   transmitting the first collimated light from the intensity modulation matrix to a first patterned retarder row;
   receiving, on the first row of intensity modulation matrix, second collimated light impinging on the intensity modulation matrix at a second angle; and transmitting the second collimated light from the intensity modulation matrix to a second patterned retarder row.

7. The method of claim 6, wherein the second patterned retarder row is separated from the first patterned retarder row by a single row.

8. The method of claim 6, wherein the second patterned retarder row is separated from the first patterned retarder row by a pair of rows.

9. The method of claim 1, wherein the rows extend along a horizontal axis of the patterned retarder and of the display layer.

10. The method of claim 1, wherein the rows extend along a vertical axis of the patterned retarder and of the display layer.

11. The method of claim 1, comprising discriminating between the first and second images through respective first and second optical components having complementary linear polarization.

12. The method of claim 1, comprising discriminating between the first and second images through respective first and second optical components having complementary circular polarization.

13. The method of claim 1, wherein the intensity modulation matrix is a liquid crystal display panel.

* * * * *